United States Patent [19]

Inaki

[11] Patent Number: 5,041,961
[45] Date of Patent: Aug. 20, 1991

[54] TWO DIMENSIONAL GENERATING SYSTEM FOR THE GEOMETRY OF A MODEL USING ARTIFICIAL VISION

[75] Inventor: Goiricelaya Inaki, Durango, Spain
[73] Assignee: Ona Electro-Erosion, S.A., Spain
[21] Appl. No.: 345,105
[22] Filed: Apr. 28, 1989

[30] Foreign Application Priority Data

Jul. 12, 1988 [ES] Spain .................................. 8802189

[51] Int. Cl.$^5$ ............................................. G06K 9/48
[52] U.S. Cl. ...................................... 364/191; 382/22
[58] Field of Search ...................... 382/22, 49, 16, 20, 382/21; 364/191, 516, 521, 518, 520; 358/180, 209, 183

[56] References Cited

U.S. PATENT DOCUMENTS

| | | | |
|---|---|---|---|
| 4,561,061 | 12/1985 | Sakamoto et al. | 364/550 |
| 4,570,180 | 2/1986 | Baier et al. | 358/106 |
| 4,703,512 | 10/1987 | Saka et al. | 382/22 |
| 4,783,833 | 11/1988 | Kawabata et al. | 382/22 |
| 4,805,127 | 2/1989 | Hata et al. | 364/521 |
| 4,845,764 | 7/1989 | Ueda et al. | 382/8 |

Primary Examiner—Jerry Smith
Assistant Examiner—Paul Gordon
Attorney, Agent, or Firm—Lucas & Just

[57] ABSTRACT

Two dimensional generating system for the geometry of a model using artificial vision, that consists of a matrix camera situated in front of a model that matrixes the image and by a process of binarization converts it into white and black, it is later treated by a microprocessor that interacts with the user for the extraction of the perimeter of the image by analysis of transitions of the data coming from the binarization, and the modelization of the perimeter by determining its lines and curves, and the definition and delimiting of its lines and curves, storing the contents in a memory with a DXF format.

5 Claims, 2 Drawing Sheets

TWO DIMENSIONAL GENERATING SYSTEM FOR THE GEOMETRY OF A MODEL USING ARTIFICIAL VISION

At present, if a tool machine, for example an electro-erosion machine wants to work in the manufacture of a piece, its geometrical data must be introduced into the CNC of the machine, by the user. The invention develops a system which generates data relevant to the geometry of a model, by means of artificial vision; this data is supplied and understood directly by a peripheral of the system, in the same way as, for example, the CNC of a tool machine.

The present system envisages a two dimensional generating system for the geometry of a model using artificial vision, characterized because it consists of:

(a) a matrix camera placed in front of the model that matrixes the image and sends an analogous video signal to (b) an image acquisition card which consists of (b1) analog/digital converter of the video signal in communication with (b2) black-white binarization circuit in communication with (b3) a memory for storing the matrix of the image by memory directions through a conventional bus of the system with (c) a microprocessor with an externally activated keyboard;

(d) a work memory and a storage memory that consist of (d1) program means for the extraction of the perimeter of the image by analysis of transitions of the data that comes from binarization, in communication with (d2) program means for modelization of the perimeter by determining its lines and curves, in communication with (d3) program means for the definition and delimitation of its lines and curves, in communication with (e) a storage memory with a DXF format.

It is also characterized because the analog/digital converter converts the intensities of light transmitted by analog video signal in discrete tones of light and the binarization circuit can make a grey level digitalized image turn into a white-black binarized image, once the binarization threshold is fixed.

It is also characterized because the programming means for modelizing the perimeter determine, in order to establish the lines that form part of the perimeter:

(a) that, by a chain code, two points are aligned if they have the same code value;

(b) if a direction transition occurs and the length of the previous segment is less than a pre-established maximum, a point window is analyzed, it being decided that it is the same segment if the conditions in the previous segment are repeated in the window, and the contrary if they are not repeated.

It is also characterized because the programming means for modelizing the perimeter determine that if more than n segments are situated continuously where all are less than a pre-established value, it is a curve arc.

It is also characterized because the points of the above-mentioned segments are compared with the values of a conventional curve program functioning as curves if there is an adjustment and as segments if there is not.

It is also characterized because, by means of an externally activated keyboard, the values of the variables and the thresholds are introduced.

It is also characterized because the data acquisition card is in communication with a monitor that has a screen where the matrixed imaged is represented.

It is also characterized because it has an interface for its link-up with the peripheral that will use the information generated by the system.

A practical, non-limiting example of the present invention is described below. Other ways of carrying this out, are in no way excluded where accessory changes are included, as long as these change do not alter its basic essentials; on the other hand, this invention includes all such variants.

Figure 1:
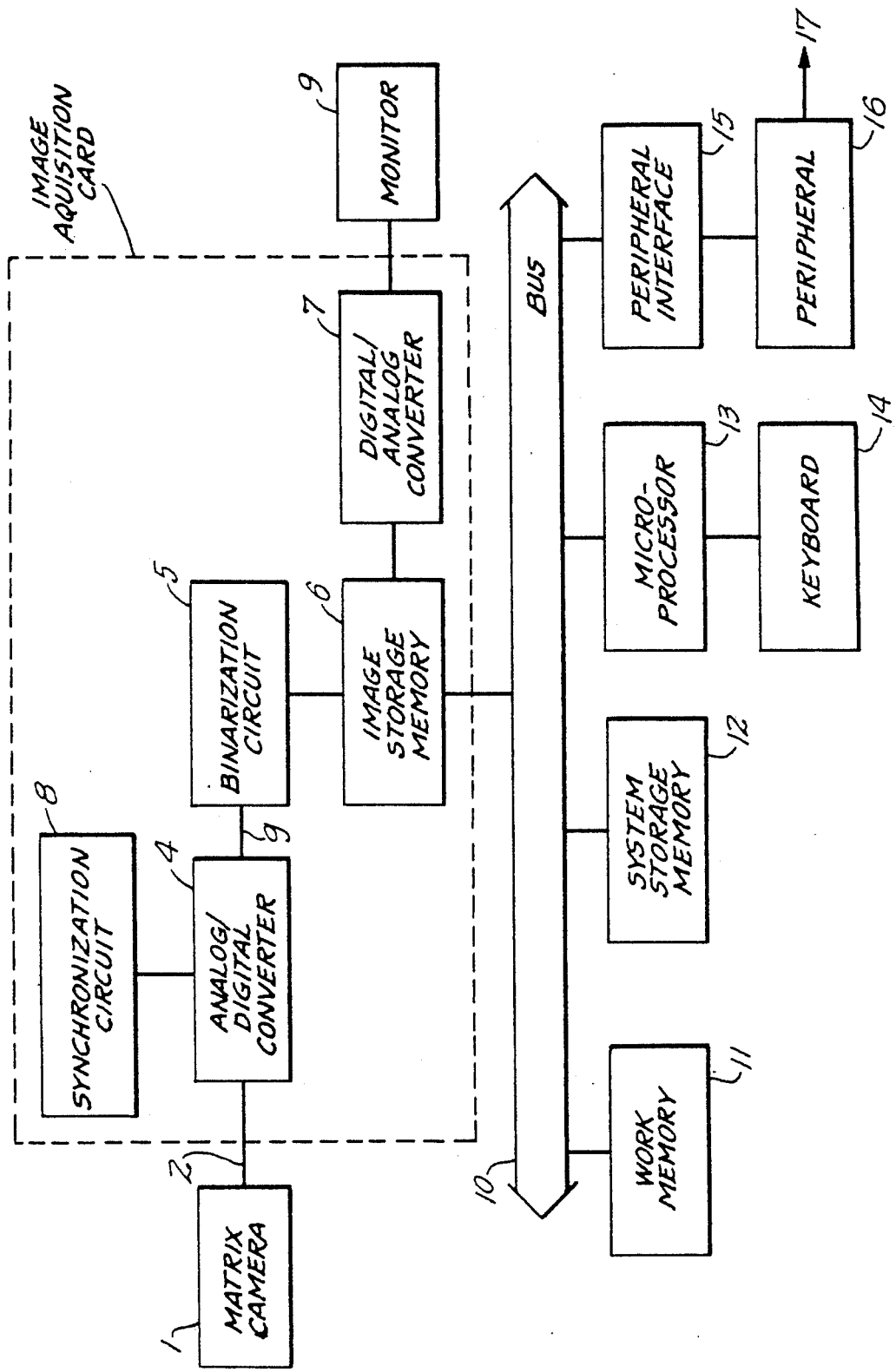
FIG. 1 is a diagram of blocks from the system.
Figure 2:
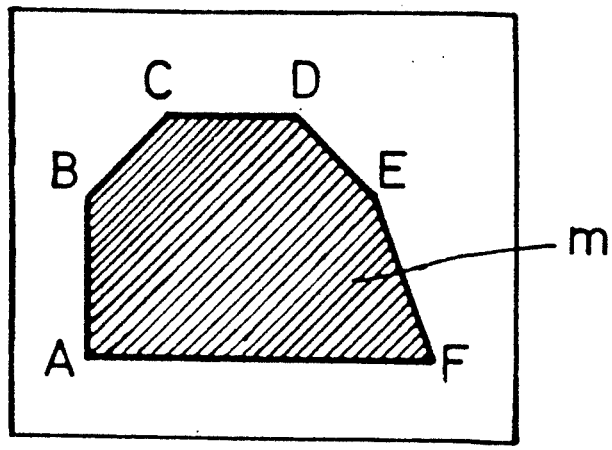
FIG. 2 is a diagrammatic representation of a model to be picked up by the system.

It has a matrix camera (1) in addition to the model in question, for example, model m in FIG. 2.

The matrix camera (1) gives out an analog video signal (2) that is sent to an image acquisition card (3;.

Figure 3:
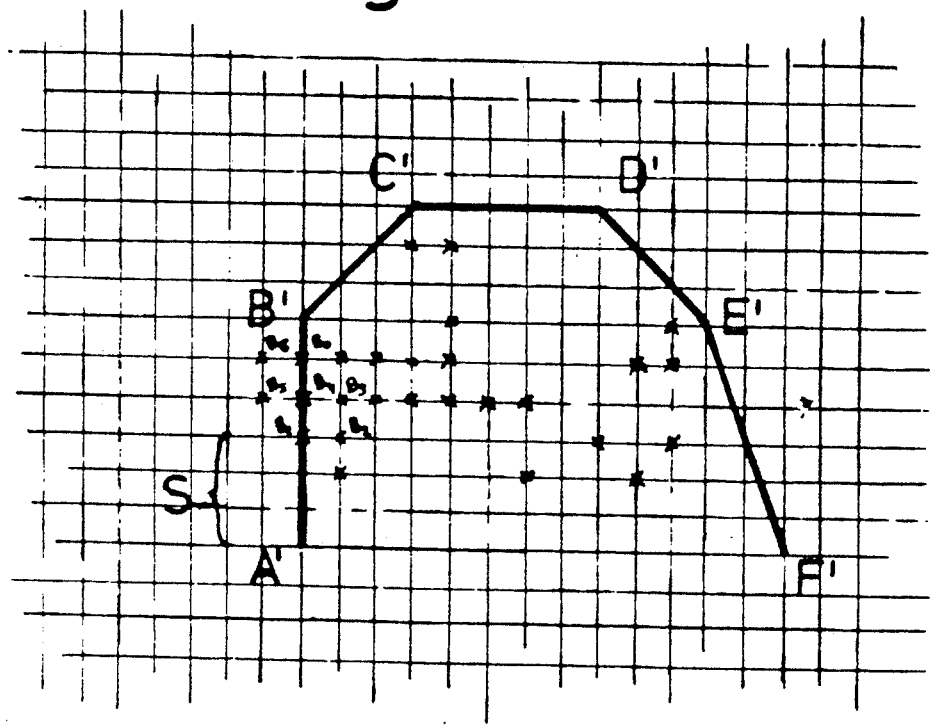
FIG. 3 is a diagram of the way the system functions with the model in FIG. 2

The analog signal (2) is digitalized by means of an analog/digital converter (4) in real time that converts the light intensities quantified by the analog signal (2) into a digital signal (g) in discrete grey tones that is picked up by a binarization circuit (5) that is capable of turning a grey level digitalized image into a white/black binarized image, once a binarization threshold is established, so that in a digital way, a content similar to that shown in FIG. 3 is obtained from the information provided by model (m) in FIG. 2.

The information coming from a binarization circuit (5) is taken to an image storing memory (6) that functions by memory directions.

The binarized information is treated by a digital/analog converter (7) whose output signal is taken to a monitor (9) on the screen of which the contents of FIG. 3 is shown The image-acquisition card (3) is connected to the rest of the system by means of the bus (10) which also has a work memory (11) for example, RAM, a storage memory (12), for example, hard disc, disquettes, etc., a main microprocessor (13) which governs a system, an interface 15) to enter into communication with peripherals (16) that can be, for example, a CNC for tool machinery.

By using an exterior keyboard (14) the user dialogues with a set of elements and can modify the variables that the system is ruled by, for example, the afore-mentioned binarization threshold.

The information coming from binarization undergoes a process by perimeter extraction program A'B'C'-D'E'F',using line by line analysis, vertical-horizontal (FIG. 3) of the white transitions (exterior A'B'C'D'E'-F')-black (A'B'C'D'E'F') deciding the transition points and consequently the perimeter.

Once the perimeter is determined, the information is subjected to a perimeter modelization program process to determine its lines and curves. This is done using a chain code that establishes that two points are aligned if they have the same code value.

Using an exterior keyboard(14) the maximum length of the segment (s) is defined, for example 20 squares, FIG. 3.

Let's suppose that the real points obtained from the previous process are: (B1), (B2), (B3), (B4), (B5), (B6), (B').

It can be seen that a transition of direction of A'B1 and B1 B2 is caused so if the length of the segment is less than the maximum longitude (s) predetermined, a point window is analyzed, for example, the points that surround a B1 in four squares in each direction, this quantity also being fixed by means of an exterior keyboard(14).

Analyzing the point window one can see whether the conditions of the chain code signaled in A'B1 (previous segment) are repeated and one can see that B2 B3 are repeated so it is decided that (B2),(B3) form part of the segment A'B1 and the contrary if these conditions are not repeated.

By this method the segments that form part of the perimeter are determined.

If as a result of what is expressed above a number greater than a predetermined number (n) of segments less than a predetermined size were to appear, followed by others, it is assumed that it is a perimeter curve and the kind of conventional curve is determined by a conventional program, for example, ellipse or parabola together with the characteristics which best adjust to the above-mentioned segments. If it were not a conventional curve they would still be regarded as straight segments.

Once the lines and curves of the perimeter are known, the information is fed into a geometrical- entities definition program, the segments being defined by their initial and final points and by the curves, for example, a circumference arc by its initial point, final point, centre and radius of the circumference.

The geometry obtained is stored in a conventional format DXF memory used in CAD programs, later being used for the work corresponding to a tool machine, for example ,an electroerosion machine in order to obtain pieces in accordance with model (m).

The possibility of modifying the variables and thresholds of the system using an exterior keyboard (14) allow a reiterative approximation process to be utilized by the user of the results that appear on the monitor (9) with respect to the original plans (FIG.2).

I claim:

1. A system for generating a two dimensional image of the geometry of a model using artificial vision comprising:
   (a) a matrix camera which matrixes the model image and which has means for sending an analog video signal;
   (b) an image acquisition card connected to the system by a connection bus which is adapted to receive the analog video signal from the matrix camera and which comprises:
      (i) an analog/digital converter which converts the video signal;
      (ii) a black-white binarization circuit which receives the converted video signal;
      (iii) an image storage memory which is in communication with the binarization circuit;
   (c) a microprocessor;
   (d) a keyboard connected to the microprocessor;
   (e) a work memory for the microprocessor;
   (f) a system storage memory comprising:
      (i) perimeter extraction program means for the extraction of the perimeter of the image by analysis of the data coming from the black-white binarization circuit;
      (ii) perimeter modelization program means for the modelization of the perimeter by determining the lines and curves of the perimeter by assigning a maximum length to a perimeter segment being analyzed and:
         (A) if the length of the measured segment is less than the predetermined maximum length, a comparison is made between the segment being currently measured with the segment previously measured by comparing a predetermined number of points in each segment by a chain code and if the conditions of the chain code are the same for each segment, there is no transition in direction, while if the conditions of the chain code are not the same, there is a transition in direction;
         (B) if more than a predetermined number of segments situated along the perimeter in a continuous manner have less than a predetermined length, the segments form a curve; and
      (iii) line definition means for the definition of the curve wherein the points of the segments of the curve are compared with the value of a curve program and determination is made that if there is an adjustable difference in the curves being compared, the segments are defined as a particular type of curve, and that if there is not an adjustable difference in the curves being compared, the segments are not defined as a curve but as straight segments; and
   (g) a storage memory with a DXF format for storing the generated geometry of the model.

2. The system of claim 1 wherein the analog/digital converter converts the intensities of light transmitted by the analog video signal into discrete tones of light and the binarization circuit is adapted to turn a grey level digitalized image into a binarized black-white image once the binarized threshold is fixed at a predetermined level.

3. The system of claim 1 wherein the predetermined values are introduced into the system by means of the keyboard.

4. The system of claim 1 further comprising a monitor connected to the image acquisition card, the monitor being adapted to display the matrixed image.

5. The system of claim 1 further comprising an interface for communication between the system and a peripheral.

* * * * *

UNITED STATES PATENT AND TRADEMARK OFFICE
CERTIFICATE OF CORRECTION

PATENT NO. : 5,041,961
DATED : August 20, 1991
INVENTOR(S) : Inaki Goiricelaya

It is certified that error appears in the above-identified patent and that said Letters Patent is hereby corrected as shown below: Title page:

Item (19) "Inaki" should read --Goiricelaya--.

Change the inventor's name from "Goiricelaya Inaki" to --Inaki Goiricelaya--.

Column 2, line 24, change "(3;" to --(3)--.

Column 2, line 41, after "shown" insert --.--.

Column 2, line 47, change "15)" to --(15)--.

Column 3, line 6, change "longitude" to --length--.

Signed and Sealed this

Second Day of March, 1993

*Attest:*

STEPHEN G. KUNIN

*Attesting Officer*  *Acting Commissioner of Patents and Trademarks*